United States Patent
Yamaoka et al.

(10) Patent No.: US 9,889,853 B2
(45) Date of Patent: Feb. 13, 2018

(54) VEHICULAR CONTROL SYSTEM

(71) Applicant: HONDA MOTOR CO., LTD., Minato-ku, Tokyo (JP)

(72) Inventors: Yusuke Yamaoka, Wako (JP); Noriaki Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/511,744

(22) PCT Filed: Aug. 26, 2015

(86) PCT No.: PCT/JP2015/073962
§ 371 (c)(1),
(2) Date: Mar. 16, 2017

(87) PCT Pub. No.: WO2016/042991
PCT Pub. Date: Mar. 24, 2016

(65) Prior Publication Data
US 2017/0259828 A1    Sep. 14, 2017

(30) Foreign Application Priority Data
Sep. 16, 2014    (JP) .................................. 2014-187417

(51) Int. Cl.
*B60W 30/18* (2012.01)
*B60W 10/04* (2006.01)
(Continued)

(52) U.S. Cl.
CPC ...... *B60W 30/18172* (2013.01); *B60W 10/04* (2013.01); *B60W 10/18* (2013.01);
(Continued)

(58) Field of Classification Search
CPC .......... B60W 30/18172; B60W 10/04; B60W 10/18; B60W 30/02; B60W 50/14
(Continued)

(56) References Cited

U.S. PATENT DOCUMENTS

| | | | | |
|---|---|---|---|---|
| 8,126,626 B2* | 2/2012 | Zagorski | ................... | B60T 7/22 188/358 |
| 2011/0066342 A1* | 3/2011 | Ozaki | ..................... | B60T 7/042 701/70 |
| 2015/0151747 A1* | 6/2015 | Fairgrieve | ................. | B60T 7/22 701/91 |

FOREIGN PATENT DOCUMENTS

| | | |
|---|---|---|
| JP | S62-6441 U | 1/1987 |
| JP | 2000-205015 A | 7/2000 |

(Continued)

*Primary Examiner* — Yazan A Soofi
(74) *Attorney, Agent, or Firm* — Carrier Blackman & Associates, P.C.; Joseph P. Carrier; Fulchand P. Shende

(57) ABSTRACT

The system is provided with a controller that controls the acceleration and deceleration of the vehicle according to the operation quantity of an accelerator pedal, and a state detector that determines whether a wheel is in a slippery state. The controller sets a deceleration region corresponding to a relatively small amount of operation and an acceleration region corresponding to a relatively large operation quantity regarding the operation quantity, and controls such that, in at least partially, the deceleration of the vehicle is increased as the operation quantity decreases, while in at least a part of the acceleration region, the acceleration of the vehicle is increased as the operation quantity increases. When the state detector detects a slippery state, the controller decreases the maximum deceleration that can be produced in the deceleration region.

6 Claims, 13 Drawing Sheets

(51) Int. Cl.
*B60W 10/18* (2012.01)
*B60W 30/02* (2012.01)
*B60W 50/14* (2012.01)
*B60W 10/184* (2012.01)

(52) U.S. Cl.
CPC ............ *B60W 30/02* (2013.01); *B60W 50/14* (2013.01); *B60W 10/184* (2013.01); *B60W 2520/26* (2013.01); *B60W 2540/10* (2013.01); *B60W 2550/12* (2013.01); *B60W 2710/18* (2013.01); *B60W 2720/106* (2013.01)

(58) Field of Classification Search
USPC .......................................................... 701/71
See application file for complete search history.

(56) References Cited

FOREIGN PATENT DOCUMENTS

| | | |
|---|---|---|
| JP | 2005-119533 A | 5/2005 |
| JP | 2006-175943 A | 7/2006 |
| JP | 2011-063122 A | 3/2011 |
| JP | 2013-010429 A | 1/2013 |
| JP | 2014-104779 A | 6/2014 |
| JP | 2015-098224 A | 5/2015 |

* cited by examiner

VEHICULAR CONTROL SYSTEM

TECHNICAL FIELD

The present invention relates to a vehicular control system.

BACKGROUND ART

As a technology regarding the accelerator pedal, Patent Document 1 disclosed a technology in which a throttle valve opening is controlled to be decreased with respect to an accelerator pedal operation quantity (depression quantity) when raining is detected. Further, Patent Document 2 disclosed a technology in which a vehicle has a one-pedal mode in which a deceleration region is made in an operation region where an operation stroke of the accelerator pedal is small and an acceleration range is made in an operation region where the operation stroke of the accelerator pedal is large.

PRIOR ART

Patent Document

PATENT DOCUMENT1: JP utility model 62-6441
PATENT DOCUMENT2: JP 2006-175943

SUMMARY OF INVENTION

Problem to be Solved by Invention

Incidentally, as disclosed in Patent Document 1, when a vehicle is in a slippery state due to raining or the like, the driver tends to operate an accelerator pedal in a return direction of the accelerator pedal to suppress slip of the vehicle. Regarding this, as disclosed in Patent Document 2, in the one-pedal mode in which the deceleration region is formed in a range where the operation stroke of the accelerator pedal is short, when the driver operates the accelerator pedal in the return direction. As disclosed in Patent Document 2, there may be a case in which the mode enters the deceleration region in the one-pedal mode unintentionally for the driver.

In this case, when the deceleration in the deceleration region of the one-pedal mode is large, vehicle wheels are rapidly decelerated. As a result, the vehicle wheels conversely become liable to slip unintentionally for the driver, which may give the driver discomfort feeling.

Accordingly, the present invention aims to provide a vehicular control system, having an acceleration region and a deceleration region within an operation range of the one-operation pedal, and reduces the discomfort feeling to the driver in a slippery state of the vehicle.

Means for Solving Problem

As means for solving the problem, an aspect of the present invention provides a vehicular control system comprising: a controller for controlling acceleration and deceleration of a vehicle in accordance with the operation quantity of an operation pedal;
a state detector for detecting whether a vehicle wheel is in a slipping state or not; and
corrected operation quantity acquiring means for acquiring the corrected operation quantity which is derived by correcting the operation quantity of the operation pedal on the basis of the detection result of the state detector,
wherein the controller:
sets, with respect to the operation quantity, a deceleration region and an acceleration region, the deceleration region corresponding to the operation quantity having a relatively small value, the acceleration region corresponding to the operation quantity having a relatively large value;
sets the deceleration in the deceleration region and the acceleration in the acceleration region on the basis of the corrected operation quantity acquired by the corrected operation quantity acquiring means;
controls, in at least a part of the deceleration region, the deceleration to increase as the operation quantity decreases;
controls, in at least a part of the acceleration region, the acceleration to increase as the operation quantity increases; and
decreases the maximum deceleration which is as large as a deceleration can be generated in the deceleration region when the state detector detects that the vehicle wheel is in a slipping state.

According to the configuration, when it is detected that the state detector that the wheel is in a slippery state, the controller decreases the maximum deceleration speed as large as the controller can generate the deceleration speed in the deceleration region. As a result, the maximum declaration is reduced, when the driver returns the operation pedal, that is, when the operation quantity enters the deceleration region by decreasing the operation quantity by the driver. As described above, because the maximum deceleration becomes small, it becomes hard for the vehicle to slip in the deceleration region, which can suppress the discomfort feeling of the driver.

Further, in the vehicular control system, it is preferable that the maximum deceleration is set in a released state of the operation pedal.

According to the above-described configuration, because the maximum deceleration is set in the released state of the operation pedal, the maximum deceleration can be obtained by releasing the operation pedal.

Further, in the vehicular control system, it is preferable that the variation quantity of deceleration or acceleration with respect to the operation quantity of the operation pedal is decreased at least partially.

According to the above-described configuration, when the state detector detects that the vehicle wheel is in a slippery state, the controller makes such a setting that the variation quantity of the deceleration or the acceleration with respect to the operation quantity of the operation pedal is reduced at least partially. This reduces the change quantity in the deceleration or the acceleration corresponding to the operation quantity of the operation pedal at least partially, so that the deceleration or the acceleration hardly changes rapidly. Accordingly, the vehicle easily recovers from the slippery state.

As described above, the vehicular control system further includes corrected operation quantity acquiring means for acquiring the corrected operation quantity which has been derived by correcting the operation quantity of the operation pedal on the basis of the detection result of the state detector,
wherein the controller sets the deceleration in the deceleration region and the acceleration in the acceleration region on the basis of the corrected operation quantity acquired by the corrected operation quantity acquiring means.

According to this configuration, the controller sets the deceleration in the deceleration region and the acceleration in the acceleration region on the basis of the corrected operation quantity acquired by the corrected operation quantity acquiring means. Accordingly, a map in which the operation quantity of the operation pedal is associated with the deceleration and the acceleration (a basic map in the embodiment described later, see FIG. 5), can be shared between a non-slippery state (a normal state in the embodiment described later) and slippery state of the vehicle wheel (slippery state in the embodiment described later, see FIG. 5).

Preferably, the vehicular control system further includes an informing means that informs the driver, when the maximum deceleration in the deceleration region is decreased.

According to such a configuration, when the maximum deceleration in the deceleration region is decreased, the informing device informs the driver, so that the driver can recognize that the controller decreases the maximum deceleration in the deceleration region. As a result of this, when a further deceleration is necessary, the driver can decelerate the vehicle by operating another deceleration generating means.

As means for solving the problem, an aspect of the present invention provides a vehicular control system comprising:

controller for controlling acceleration and deceleration of a vehicle in accordance with the operation quantity of an operation pedal; and state detector for detecting whether a vehicle wheel is in a slipping state or not, wherein the controller:

sets, with respect to the operation quantity, a deceleration region and an acceleration region, the deceleration region corresponding to the operation quantity having a relatively small value, the acceleration region corresponding to the operation quantity having a relatively large value;

controls, in at least a part of the deceleration region, the deceleration to increase as the operation quantity decreases;

controls, in at least a part of the acceleration region, the acceleration to increase as the operation quantity increases; and eliminates the deceleration region when the state detector detects that the vehicle wheel is in a slippery state.

According to this configuration, when the state detector detects that the vehicle wheel is in the slippery state, the controller eliminates the deceleration region. Accordingly, though the operation pedal is released when the vehicle is in the slipping state, the deceleration does not occur, and the braking of the vehicle is not performed. As a result, the vehicle hardly slips in the deceleration region, which can suppress discomfort of the driver.

Further, when the deceleration region is eliminated, it is preferable to provide informing device for informing the driver.

According to this configuration, when the deceleration region is eliminated, the driver can recognize that the controller eliminated the deceleration region because the informing device informs the driver about this. When the deceleration is necessary, the driver can decelerate the vehicle by operating another deceleration generating means, for example, the brake pedal.

Advantageous Effect of Invention

According to the present invention, in the configuration having an acceleration and deceleration region with a one-operation pedal, it is possible to provide the vehicular control system in which discomfort of the driver can be decreased even in the slippery state of the vehicle.

MODES FOR CARRYING OUT INVENTION

First Embodiment

Figure 1:
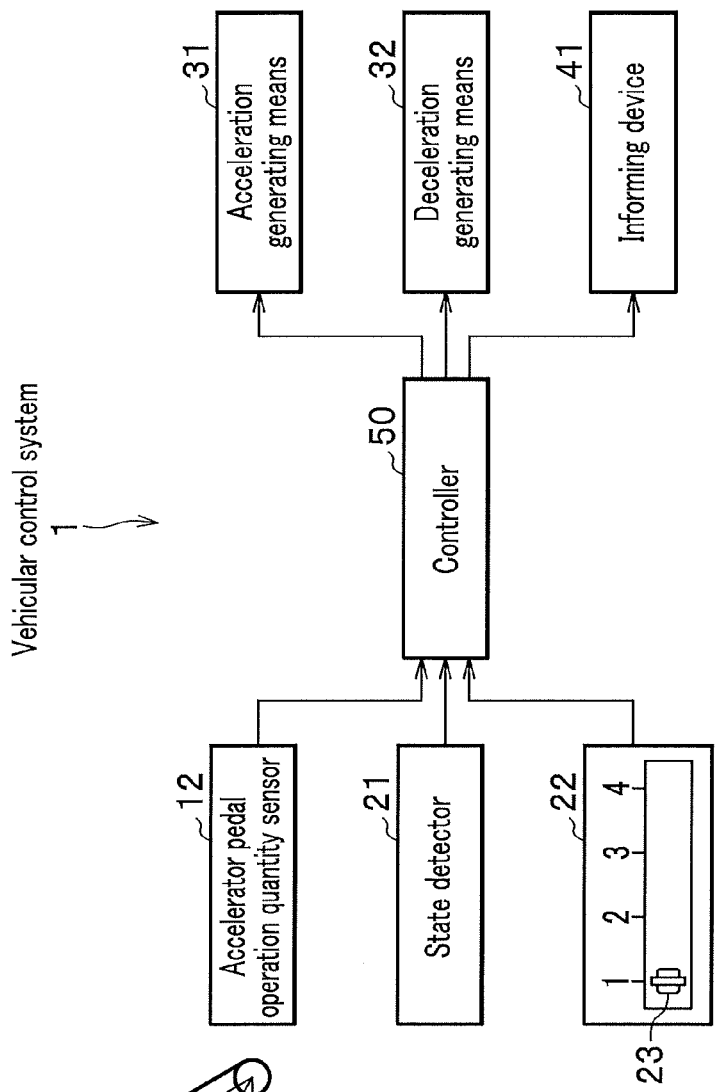
FIG. 1A is a side view of an accelerator pedal.
FIG. 1B is a block diagram illustrating configuration of the vehicular control system according to a first embodiment.

Referring to FIGS. 1A to 3, a first embodiment of the present invention is described below.

<<Configuration of the Vehicular Control System>>

A vehicular control system 1 shown in FIG. 1B is a system for controlling acceleration and deceleration of a vehicle in accordance with an operation quantity of an accelerator pedal (operation pedal). The vehicle is, for example, a gasoline vehicle, a hybrid vehicle, and an electric vehicle. The vehicular control system 1 includes an accelerator pedal 11, an accelerator pedal operation quantity sensor 12, a state detector 21, a deceleration switch 22, an acceleration generating means 31, a deceleration generating means 32, an informing device 41, and a controller 50.

<Accelerator Pedal>

FIG. 1A shows the accelerator pedal 11 is a pedal so-called "one pedal" disposed at a driver's seat place under a foot of the driver, to which a deceleration region and an acceleration region are assigned to the operation range thereof. The accelerator pedal 11 is, for example, of a hanging type or an organ type.

<Basic Map>

Figure 3:
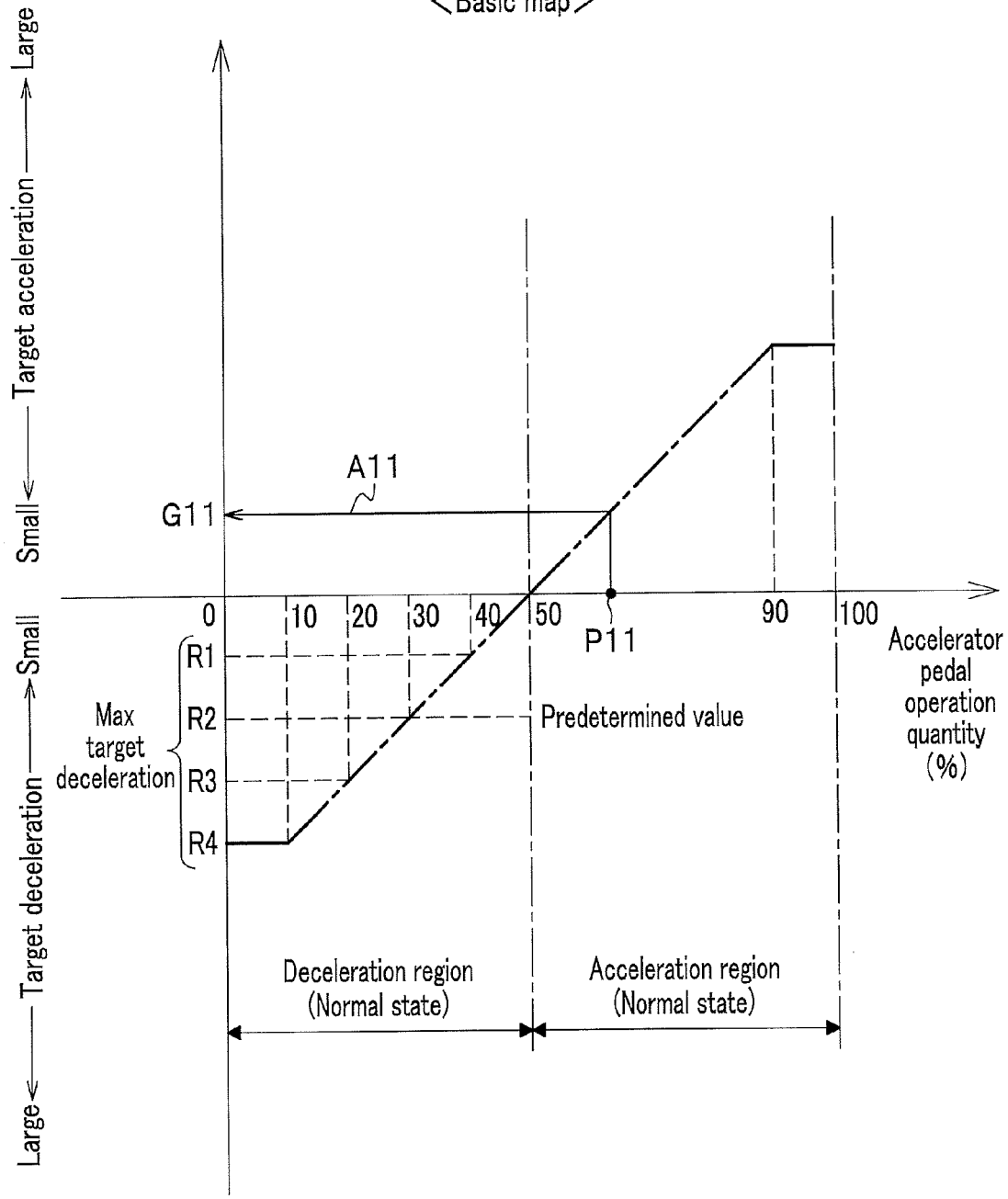
FIG. 3 shows a basic map illustrating a relationship between an operation quantity of the accelerator pedal and a target acceleration and a target deceleration according to the first embodiment.

An operation range of the accelerator pedal 11 is set to have a deceleration region in a range where the operation quantity is relatively small, i.e., zero to 50% of the operation quantity and an acceleration region in a range where the operation quantity is relatively large, i.e., 50 to 100% of the operation quantity as shown in the basic map in FIG. 3.

The deceleration region is a region where the vehicle is decelerated and the acceleration region is a region where the vehicle is accelerated. When the operation quantity is 50%, the target deceleration and the target acceleration are zero. Further, the deceleration region and the acceleration region are sectioned at the operation quantity of 50%. However, this is not limited to this, and may be sectioned at 40%, or 60% of the operation quantity, and may be modified appropriately.

<Basic Map-Deceleration Region>

This is further described below.

In the basic map according to the first embodiment, in the deceleration region, the target deceleration speed is set to become large as the operation quantity of the accelerator pedal 11 becomes smaller than 50%. Further, in the deceleration region, four steps of maximum deceleration are set (first maximum deceleration R1, second maximum deceleration R2, third maximum deceleration R3, and fourth maximum deceleration R4). However, the present invention is not limited to the four steps, but may be three steps, five steps, or may be set steplessly.

There is such a relationship that the deceleration which becomes larger as the step varies from the first maximum deceleration R1, the second maximum deceleration R2, the third maximum deceleration R3, and the fourth maximum deceleration R4, so that a larger braking force is required to be generated.

The first maximum deceleration R1 is a maximum deceleration to be selected when a lever 23 described later (see FIG. 1) is located at a position of "1", the operation quantity is set to have a constant magnitude in a rage of 0 to 40%. When the first maximum deceleration R1 is selected, there is such a relation that the target deceleration decreases as the operation quantity increases in the range of the operation quantity from 40 to 50%. More specifically, there is such a relation that the target deceleration becomes large as the operation quantity is reduced.

The second maximum deceleration R2 is a maximum deceleration selected when the lever 23 (see FIG. 1), and located at a position of "2" and set to have a constant magnitude in the range of the operation quantity is from zero to 30%. When the second maximum deceleration R2 is selected, the target deceleration becomes smaller as the operation quantity becomes large in the range of the operation quantity from 30% to 50% (at least a part of the deceleration region). In other words, there is such a relation that the more decreases the operation quantity, the larger the target deceleration becomes.

The third maximum deceleration R3 is a maximum deceleration selected when the lever 23 described later (see FIG. 1) is located at a position of "3" and set to have a constant magnitude in the range of the operation quantity is from zero to 20%. In the relation, when the third maximum deceleration R3 is selected, the target deceleration decreases as the operation quantity increases in the range of the operation quantity from 20% to 50% (at least a part of the deceleration region). In other words, there is such a relation that the target deceleration becomes large as the operation quantity decreases.

The fourth maximum deceleration R4 is a maximum deceleration selected when the lever 23 described later (see FIG. 1) is located at a position of "4" and set to have a constant magnitude in the range of the operation quantity is from zero to 10%. In the relation, when the fourth maximum deceleration R4 is selected, the target deceleration becomes smaller as the operation quantity becomes large in the range of the operation quantity from 10% to 50% (at least a part of the deceleration region). That is, in the relation, the target deceleration increases as the operation quantity decreases.

A state in which the operation quantity of the accelerator pedal 11 is 0% corresponds to a released state of the accelerator pedal 11. That is, the maximum target decelerations are set in the ranges of 0 to 40%, 0 to 30%, 0 to 20%, 0 to 10% of the operation quantity including the state in which the operation quantity is 0% (a released state), respectively.

<Acceleration Region in Basic Map>

There is such a relation that the target acceleration increases as the operation quantity increases in the range of 50% to 90% of the operation quantity of the accelerator pedal 11. In other words, in the relation, the target acceleration becomes large as the operation quantity increases.

The maximum target accelerations are constant in the range of operation quantity of the accelerator pedal 11 from 90% to 100%.

<Accelerator Pedal Operation Quantity Sensor>

The accelerator pedal operation quantity sensor 12 is a sensor for detecting the operation quantity of the accelerator pedal 11. The accelerator pedal operation quantity sensor 12 supplies an output of the detected operation quantity to the controller 50.

<State Detector>

The state detector 21 is configured including a CPU, a ROM, a RAM, etc. to detect whether the wheels of the vehicle are in slipping states (slippery states). The slipping state includes a state of the wheel being actually slipping and a state in which the wheels are liable to slip. The state detector 21 supplies the detection result to the controller 50.

The state detector 21 detects (determines) that the vehicle is in the slipping state, for example, (1) when the wheel speed calculated on the basis of the vehicle speed signal from the wheel deviates from the vehicle speed by a predetermined value or more, or (2) when a slipping rate is equal to or greater than a predetermined value. The slip rate S is calculated on the basis of a vehicle wheel speed Vw and a vehicle speed Vv according to Eq. (1).

$$S = (Vv - Vw)/Vv \quad (1)$$

Additionally, the state detector 21 is caused to detect that the vehicle is in the slipping state, when an ambient temperature is equal to or lower than a predetermined temperature (for example, 0 to 5) at which road freezing is expected, the state detector 21 detects that the vehicle is in the slipping state.

Further, the state detector 21 detects that the vehicle is in the slipping state when it is determined that the vehicle is travelling at a slippery place (such as a rainy region, or snow-fall area, etc.) from navigation information.

<Deceleration Switch>

The deceleration switch 22 is an input device for inputting a maximum deceleration speed after selecting the maximum deceleration speed selected by the driver. The deceleration switch 22 includes the lever 23 which is slidably operated based on the maximum deceleration demanded by the driver. More specifically, four positions "1", "2", "3", "4" at which the lever 23 is positioned corresponding to the first to fourth maximum decelerations R1 to R4, are set in the deceleration switch 22.

When the lever 23 is positioned at the position of "1", the deceleration switch 22 detects that the driver selects the first maximum deceleration R1 and supplies the detection result to the controller 50. This operation is made similarly for the positions "2", "3", "4". The operation device for selecting the position is not limited to the sliding type, but may be a dial type (rotational type).

<Acceleration Generating Means>

The acceleration generating means 31 is a means, controlled by the controller 50, for generating an acceleration to accelerate the vehicle. The acceleration generating means 31 is, for example, an engine (internal combustion engine), and an electric motor. Further, the acceleration generating means 31 may be configured including these two power sources.

<Deceleration Generating Means>

The deceleration generating means 32 is a means, controlled by the controller 50, for generating deceleration to decelerate the vehicle. The deceleration generating means 32 is, for example, a friction brake (disk brake, a drum brake), engine braking, and regenerative braking. Further, the deceleration generating means 32 may include these two or more. Further, the friction brake can generate largest deceleration.

<Informing Device>

The informing device 41 is a means, controlled by the controller 50 for informing the driver that the vehicle is in the slipping state to the driver. A method of informing is, for example, generation of an alarm sound, displaying an icon on a meter or a navigation screen, increase in a reaction force or applying vibrations to the accelerator pedal by an acceleration pedal reaction force applying device.

<Controller>

The controller 50 is a control device, configured including a CPU, ROM, RAM, interfaces, electronic circuit, etc., for electronically controlling the vehicular control system 1. The controller 50 controls various devices in accordance with programs stored therein to execute various processes to control various devices.

<Maximum Deceleration Speed Correcting Function in Controller>

In the slipping state, when the maximum deceleration inputted from the deceleration switch 22 through the selection by the driver is larger than the predetermined value (predetermined maximum deceleration), the controller (maximum deceleration correcting means) 50 has a function to correct the basic map to make the maximum deceleration equal to or smaller than the predetermined value. Here, a case in which the predetermined value is the second maximum deceleration R2 is exemplified. In other words, the controller 50 has a function to correct the maximum deceleration to a second maximum deceleration R2 in a slipping state, when the driver is selecting the third maximum deceleration R3 or the fourth maximum deceleration R4.

<Target Acceleration and Target Deceleration Calculating Function in Controller>

The controller 50 has a function of calculating the target acceleration and the target deceleration on the basis of the actual operation quantity, and the basic map in FIG. 3 in a normal state and the slipping state.

<Acceleration and Deceleration Control Function in Controller>

The controller 50 includes a function of controlling the acceleration generating means 31 and the deceleration generating means 32 in accordance with the target acceleration and the target deceleration.

<<Operation and Advantageous Effect in the Vehicular Control System>>

Figure 2:
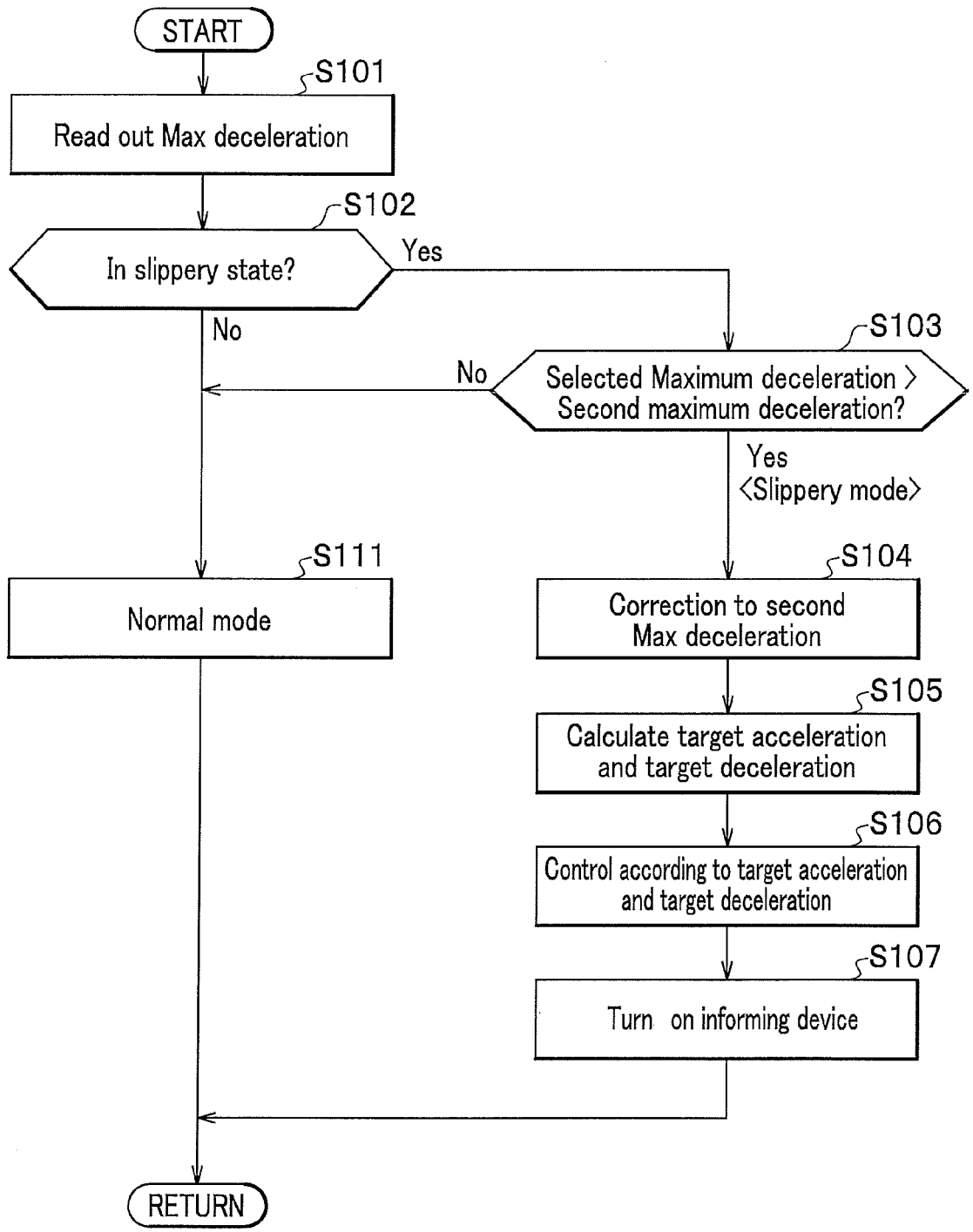
FIG. 2 is a flow chart illustrating an operation of the vehicular control system according to the first embodiment.

Referring to FIG. 2, operation and advantageous effect of the vehicular control system 1 is described below.

The controller 50 reads out the maximum deceleration selected by the driver in accordance with the selected one of the positions of "1" to "4" of the lever 23 in the deceleration switch 22 in a step S101.

In addition, the maximum deceleration may be set on the basis of the travelling state of the vehicle. More specifically, because as the vehicle speed (vehicle speed or wheel speed) increases, the state becomes slippery, it is possible to set that the maximum deceleration become small.

In a step S102, the controller 50 determines whether the state detector 21 detects the slipping state of the vehicle. When the controller 50 determines whether the state detector 21 detects that the vehicle is in the slipping state (Yes in S102), processing by the controller 50 proceeds to a step S103. When the controller 50 determines that the state detector 21 does not detect that the vehicle is in the slipping state (No in S102), processing by the controller 50 proceeds to a step S111.

<Normal Mode>

In the step S111, the controller 50 controls the vehicular control system 1 in a normal mode.

More specifically, the controller 50 calculates the target acceleration or the target deceleration on the basis of the operation quantity of the accelerator pedal 11 detected by the accelerator pedal operation quantity sensor 12 and the basic map shown in FIG. 3. In this case, any one of the first maximum deceleration R1 to the fourth maximum deceleration R4 has been set in the basic map shown in FIG. 3. Further, FIG. 3 shows an example case in which an operation quantity P11 of the accelerator pedal 11 in the acceleration region (50 to 100%) and a target acceleration G11 is calculated (see an arrow A11).

When the controller 50 calculates the target acceleration, the controller 50 controls the acceleration generating means 31 so as to generate the target acceleration. On the other hand, when the controller 50 calculates the target deceleration, the controller 50 controls the deceleration generating means 32 so as to generate the target deceleration.

After this, processing by the controller 50 returns to START via "RETURN".

In the step S103, the controller 50 determines whether the maximum deceleration selected by the driver is currently greater than the second maximum deceleration R2 which is a predetermined value.

When the controller 50 determines whether the maximum deceleration selected by the driver is greater than the second maximum deceleration R2, that is, when the driver has selected the third maximum deceleration R3 or the fourth maximum deceleration R4, processing by the controller 50 proceeds to a step S104.

When the controller 50 determines that the maximum deceleration selected by the driver is not greater than the second maximum deceleration R2, that is, in the case in which the driver selected the first maximum or the second maximum deceleration R2, processing by the controller 50 proceeds to the step S111.

<Slipping Mode>

When the determination result in the step S103 is "Yes", the controller 50 controls the vehicular control system 1 in the slipping mode (S104 to S107).

In the step S104, the controller 50 corrects the maximum deceleration to the second maximum deceleration R2.

In the step S105, the controller 50 calculates the target acceleration or the target deceleration on the basis of the operation quantity of the accelerator pedal 11 and the basic map after correction.

In the step S106, the controller 50 controls the acceleration generating means 31 and the deceleration generating means 32 in accordance with the calculated target acceleration or the target deceleration.

More specifically, when the target acceleration is calculated, the controller 50 controls the acceleration generating means 31 so as to generate the target acceleration.

On the other hand, when the target deceleration is calculated, the controller 50 controls the deceleration generating means 32 so as to generate the target deceleration. Here, the maximum deceleration is set to the second maximum deceleration R2, it is difficult for the vehicle to slip though it is difficult for the vehicle to be decelerated. More specifically, even if the accelerator pedal 11 is rapidly returned, deceleration is less likely to occur.

In the step S107, the controller 50 operates the informing device 41. This provides a visual confirmation for the driver to visually recognize that the mode is currently in the slipping mode. Accordingly, for example, when deceleration is made by decreasing the accelerator operation quantity, the driver can decelerate the vehicle by depressing the brake pedal.

After this, processing of the controller 50 returns to "START" via "RETURN".

Modification in First Embodiment

The first embodiment has been described. However, the present invention is not limited to this and, for example, the present invention may be modified as follows:

In the above-described embodiment, a configuration in which a criterion (predetermined value) in the step S103 is the second maximum deceleration R2 which is a constant value, is exemplified. However, for example, there may be another configuration in which the criterion (predetermined value) is appropriately set on the basis of the travelling state of the vehicle. For example, there may be another configuration in which the criterion (predetermined value) decreases as the road surface becomes more slippery, which makes the shift to the slip mode easy.

The above-described embodiment show an example configuration in which when the maximum deceleration selected by the driver is greater than the second maximum deceleration (predetermined value) R2 (Yes in S103), the maximum deceleration selected by the driver is corrected to the second maximum deceleration R2. In addition, for example, there may be still another configuration in which the maximum deceleration is corrected to a maximum deceleration (for example, the first maximum deceleration R1) which is smaller than the second maximum deceleration R2.

Second Embodiment

Referring to FIGS. 4 to 7, a second embodiment of the present invention is described below.

Regarding this, only a part different from the first embodiment is described below.

<<Deceleration Region in Basic Map>

Figure 5:
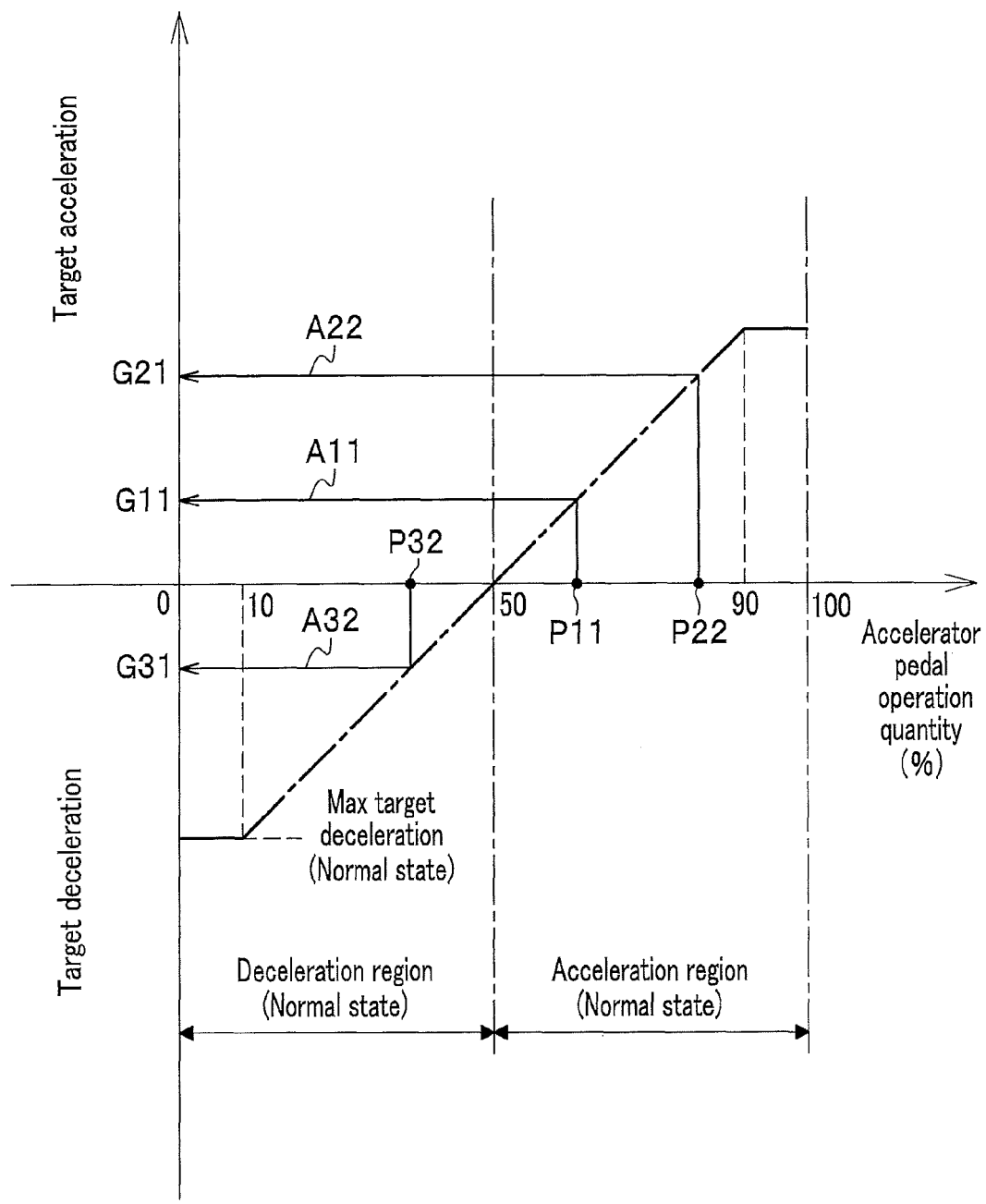
FIG. 5 shows a basic map illustrating a relationship between an operation quantity of the accelerator pedal and a target acceleration or a target deceleration according to the second embodiment.

As shown in FIG. 5, the maximum target deceleration is constant in a range of 0% to 10% of the operation quantity of the accelerator pedal 11.

There is such a relation that the target deceleration decreases as the operation quantity increases in a range of 10% to 50% of the operation quantity of the accelerator pedal 11 (at least a part of the deceleration region). That is, there is such a relation that the target deceleration increases as the operation quantity decreases.

<Acceleration Region in Basic Map>

There is such a relation that the target acceleration increases as the operation quantity increases in the range of 50% to 90% of the operation quantity of the accelerator pedal 11. That is, in the relation, as the operation quantity increases, the target acceleration becomes large.

The maximum target acceleration is constant in the range of 90% to 100% of the operation quantity of the accelerator pedal 11.

<Controller>
<Operation Quantity Correction Function in Controller>

Figure 6:
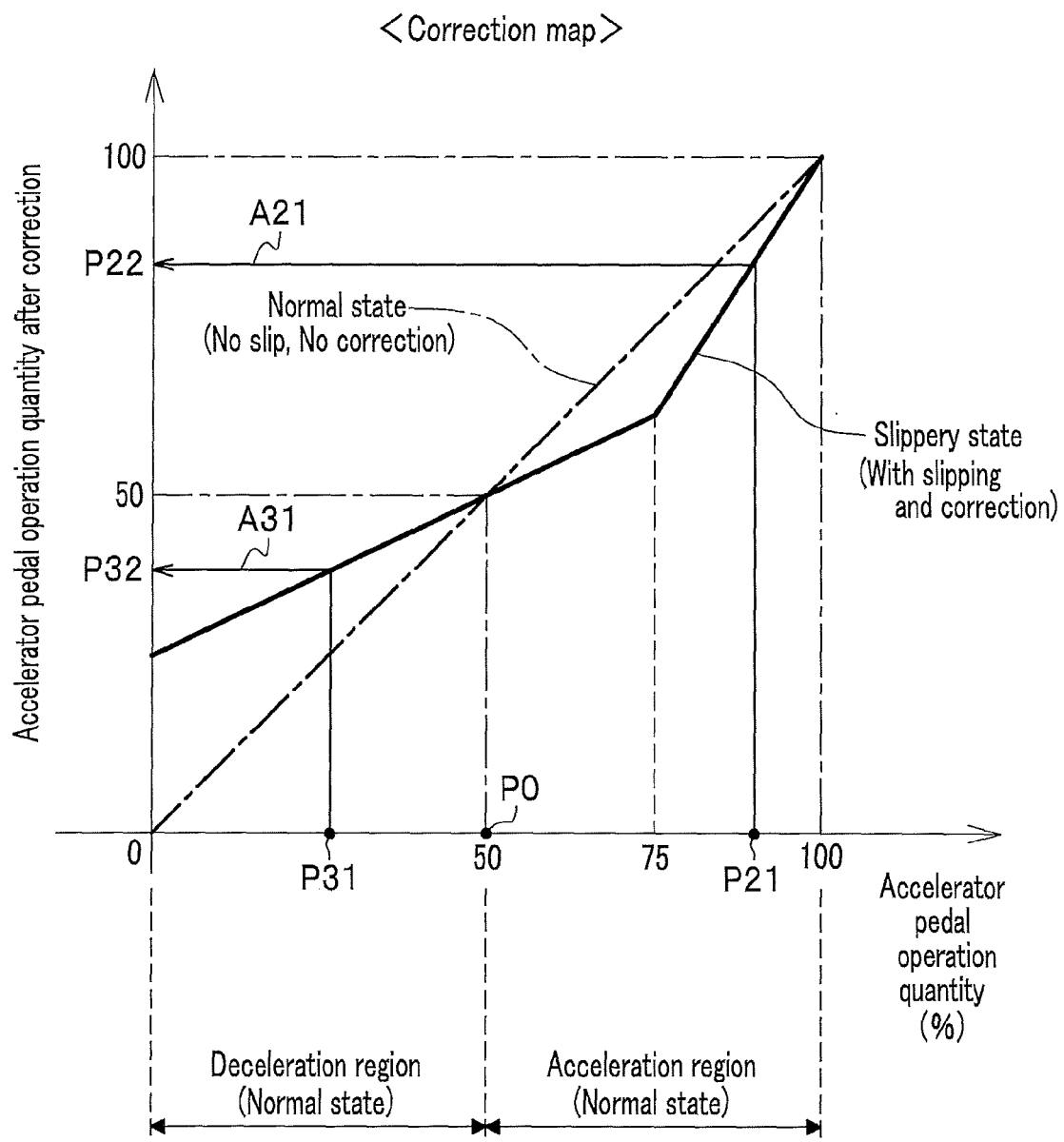
FIG. 6 shows a correction map for correcting the operation quantity of the accelerator pedal in a slipping state according to the second embodiment.

The controller (corrected operation quantity acquiring means) 50 has a function of acquiring the operation quantity (corrected quantity) after correction of the operation quantity of the actual operation quantity of the accelerator pedal 11 on the basis of the actual operation quantity of the accelerator pedal 11 at the time of slipping and the correction map shown in FIG. 6.

As shown in FIG. 6, the correction map referred upon slipping is set to increase the operation quantity after correction in the range of 0% to 50%, and the correction map is set to decrease the operation quantity after correction in the range of 50% to 100%. Further, the correction map in FIG. 6 is obtained by a prior test or the like.

<Target Acceleration and Target Deceleration Calculation Function in Controller>

The controller 50 has a function of calculating in the normal state the target acceleration, the target deceleration on the basis of an actual operation quantity and the basic map shown in FIG. 5 in the normal state.

The controller 50 has a function of calculating in the slipping state the target acceleration and the target deceleration on the basis of the operation quality after correction and the basic map in FIG. 5.

Figure 7:
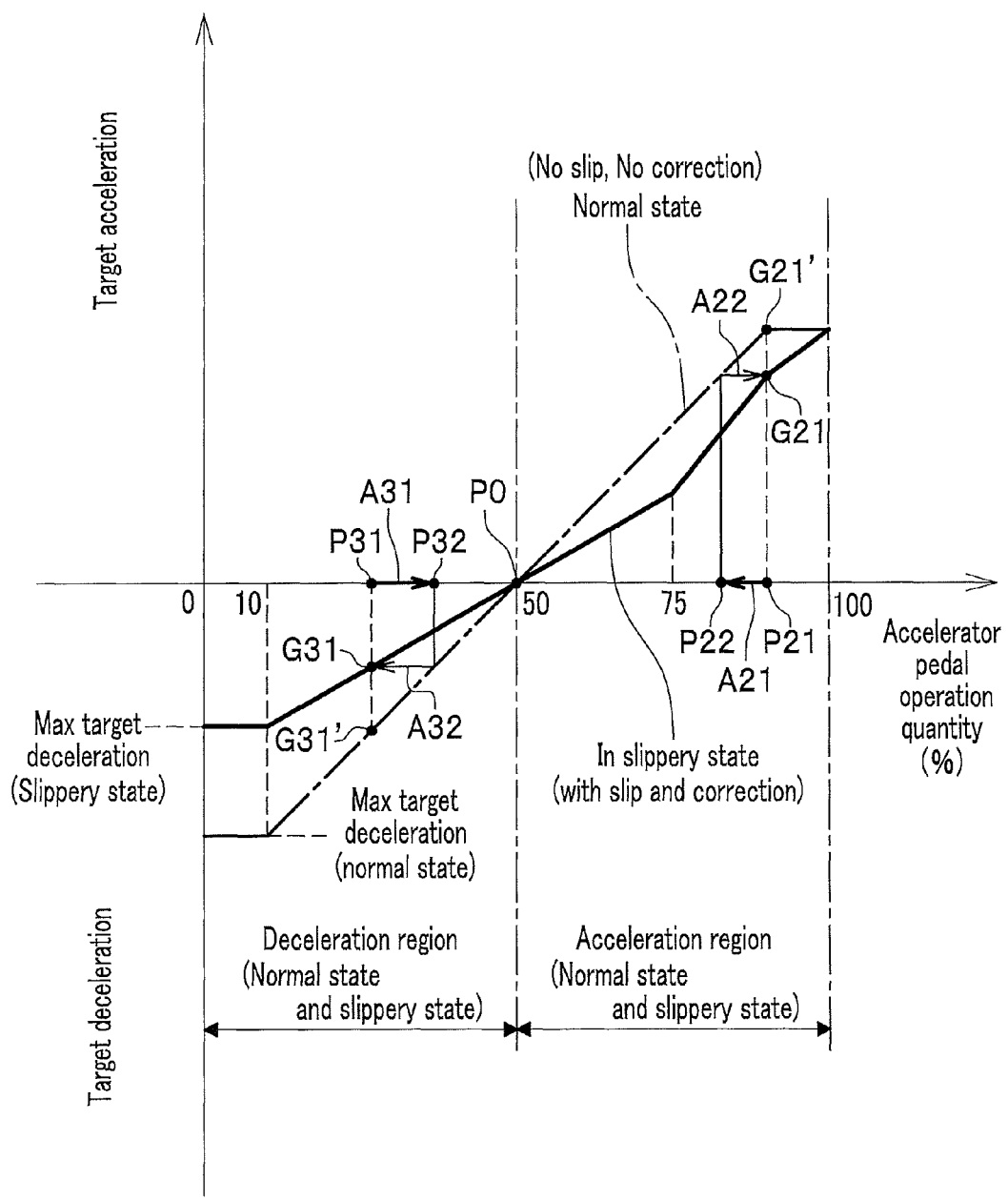
FIG. 7 is a chart illustrating a relationship between an operation quantity of the acceleration pedal and the target acceleration or a target deceleration in a normal state and in the slipping state according to the second embodiment.

As shown in FIG. 7, a change quantity of the target acceleration with respect to the operation quantity upon slipping in the range of the operation quantity of 50 to 75% in the acceleration region (50100%) (at least partially) is made smaller than the change quantity of the target acceleration with respect to the operation quantity in the normal state. This makes it difficult for the vehicle to slip because the change in the target acceleration is more moderated than that in the normal state in the range of 50% to 75% of the operation quantity.

As shown in FIG. 7, in the range of 10% to 50% of the operation quantity in the deceleration region (0 to 50%) (at least a part), the change quantity of the target deceleration with respect to the operation quantity upon slipping is made smaller than the change quantity of the target deceleration with respect to the operation quantity in the normal state. This makes it difficult for the vehicle to slip because the change in the target deceleration is moderated than that in the normal state upon slipping in the range of 10% to 50% of the operation quantity.

<<Operation and Advantageous Effect of the Vehicular Control System>>

Figure 4:
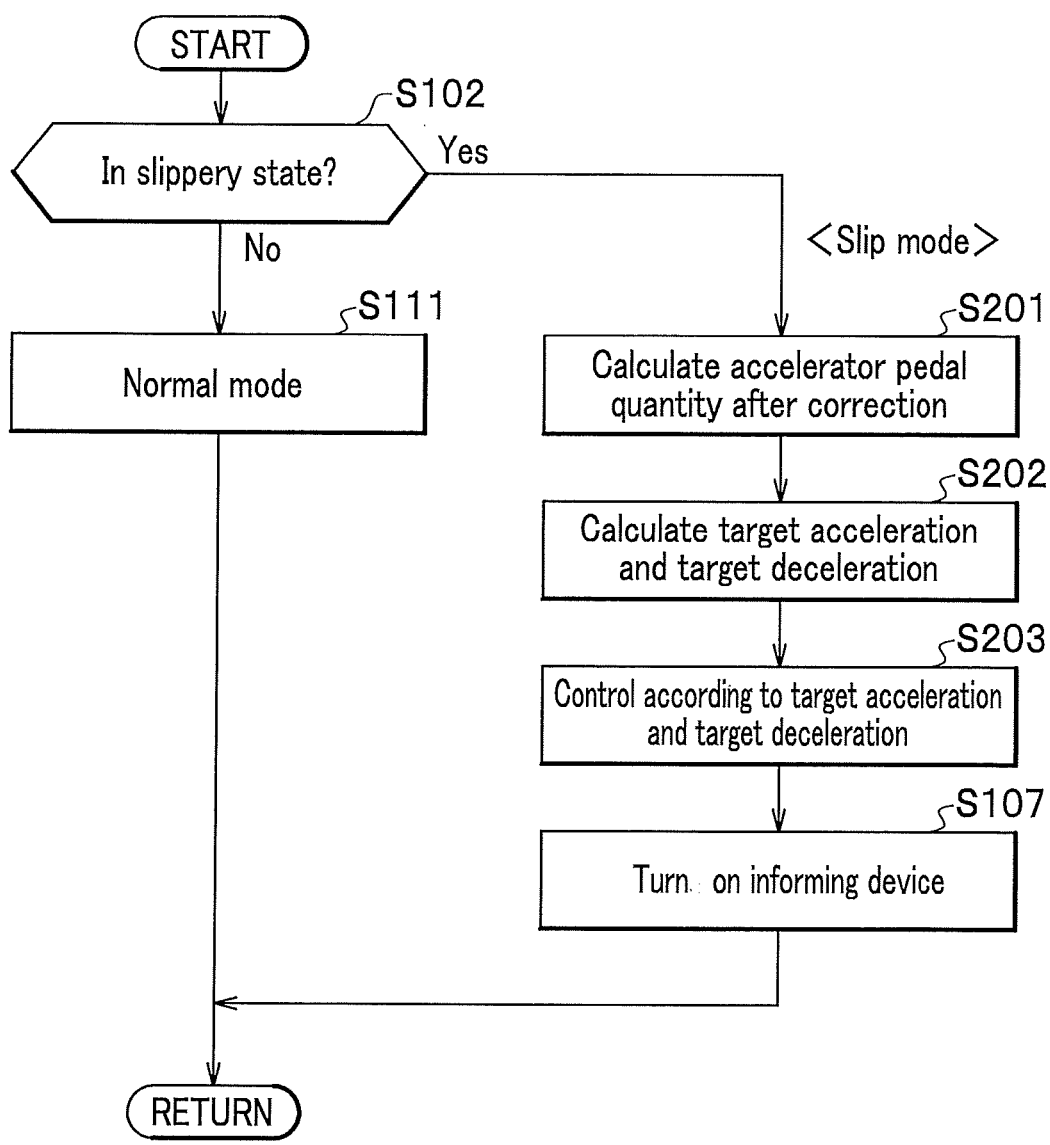
FIG. 4 is a flowchart illustrating an operation of the vehicular control system according to the second embodiment.

With reference to FIG. 4, the operation and advantage effect of the vehicular control system 1 are described below.

In a second embodiment, the process in the step S101 (see FIG. 2) according to the first embodiment is not included. When the answer in the step S102 is "YES", processing of the controller 50 proceeds to a step S201.

In the step S201, the controller 50 calculates the operation quantities (P22, P32) of the accelerator pedal after correction (see lead lines A21, A31) on the basis of the actual operation quantity of the accelerator pedal detected by the accelerator pedal operation quantity sensor 12 and the correction map as shown in FIG. 6.

Further, FIG. 6 shows an example case in which an operation quantity P22 is acquired by correcting an operation quantity P21 in the acceleration region (50 to 100%) (see lead line A21) and an operation quantity P31 in the deceleration region (0 to 50%) acquired by correcting the operation quantity P31.

In a step S202, the controller 50 calculates a target acceleration (G21) or a target deceleration (G31) on the basis of the operation quantities (P22, P32) and the basic map in FIG. 5 (see lead lines A22, A32). In addition, the process in the step S201 and the step S202 are interposed on FIG. 7.

In the acceleration region (50 to 100%), the operation quantity P22 after correction is smaller than the actual operation quantity P21. Accordingly, the target acceleration G21 corresponding to the operation quantity P21 in the slip mode is smaller than the target acceleration G21 corresponding to the operation quantity P21 in the slip mode is smaller than the target acceleration G21' corresponding to the operation quantity P21 in the normal mode (see FIG. 7).

In the deceleration region (0 to 50%), because an operation quantity P32 after correction is larger than the actual operation quantity P31, a target deceleration G31 corresponding to an operation quantity P31 in the slipping mode is smaller than the target deceleration G31' corresponding to the operation quantity P31 in the normal mode.

In a step S203, the controller 50 controls the acceleration generating means 31 and the deceleration generating means 32 in accordance with the calculated target acceleration (G21) and the calculated target deceleration (G31).

More specifically, when the target acceleration is calculated, the controller 50 controls the acceleration generating means 31 so as to generate the target acceleration. Here, the target acceleration is smaller than that in the normal mode, so that it becomes difficult to slip though the vehicle hardly accelerates.

On the other hand, when the target deceleration is calculated, the controller 50 controls the deceleration generating means 32 so as to generate the target deceleration. Because the target deceleration is smaller than that in the normal mode, it becomes difficult to decelerate the vehicle, but it becomes hard for the vehicle to slip. That is, though the accelerator pedal 11 is suddenly returned, deceleration is less likely to occur.

After this, the process by the controller 50 proceeds to the step S107.

Modifications in Second Embodiment

Figure 8:
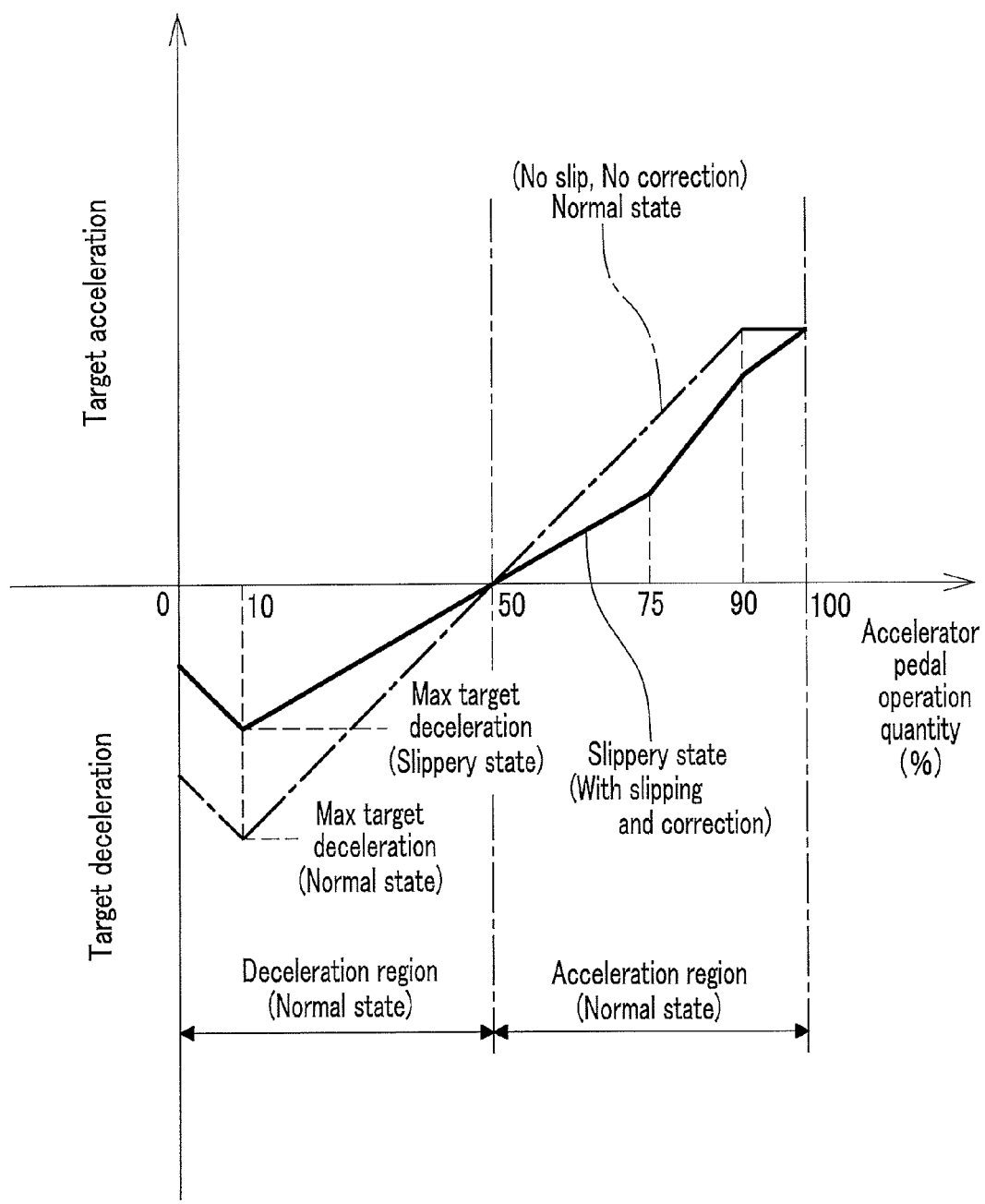
FIG. 8 shows a basic map illustrating a relationship between an operation quantity of the accelerator pedal and a target acceleration or a target deceleration according to a modification.

As the second embodiment of the present invention has been described above, the present invention is not limited to this. For example, the second embodiment may be modified as follows:

In the above-described embodiment, as shown in FIGS. 5 and 7, a configuration is exemplified in which the target deceleration is constant and is the maximum target deceleration in the range of 0 to 10% of the operation quantity of the accelerator pedal 11. However, there may be another configuration in which as shown in FIG. 8, as the operation quantity increases in the range of operation quantity from 0 to 10%, the target deceleration becomes large and the maximum target deceleration is at the operation quantity of 10%. In this configuration, upon slipping, the maximum target deceleration at the operation quantity of 10% is decreased.

Figure 9:
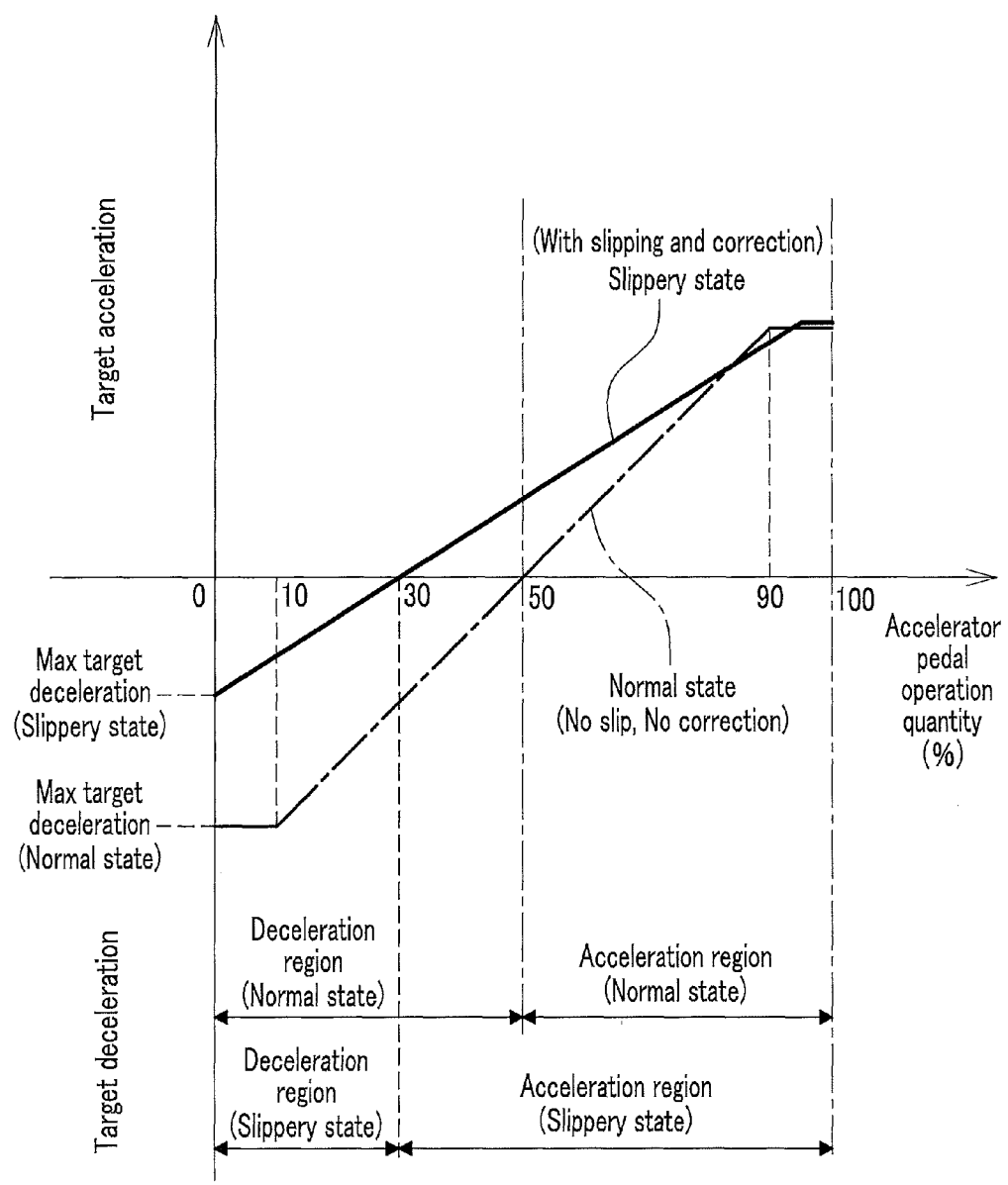
FIG. 9 is a chart illustrating a relationship between an operation quantity of the acceleration pedal and a target acceleration or a target deceleration in the normal state and in the slipping state according to the modification.

In the above-described embodiment, as shown in FIG. 7, the border between the deceleration region and the acceleration in the normal state at the operation quantity of 50% and the border between the deceleration region and the acceleration in the slipping state at the operation quantity of 50%, are the same place in the chart. However, for example, a configuration shown in FIG. 9 can be exemplified. In the configuration shown in FIG. 9, there is shift between the configuration in which the border of the operation quantity between the deceleration region and the accelerator region in the normal state, is at 50% and the configuration in which the border of the operation quantity between the deceleration region and the accelerator region in the slipping state, is at 30%.

Figure 10:
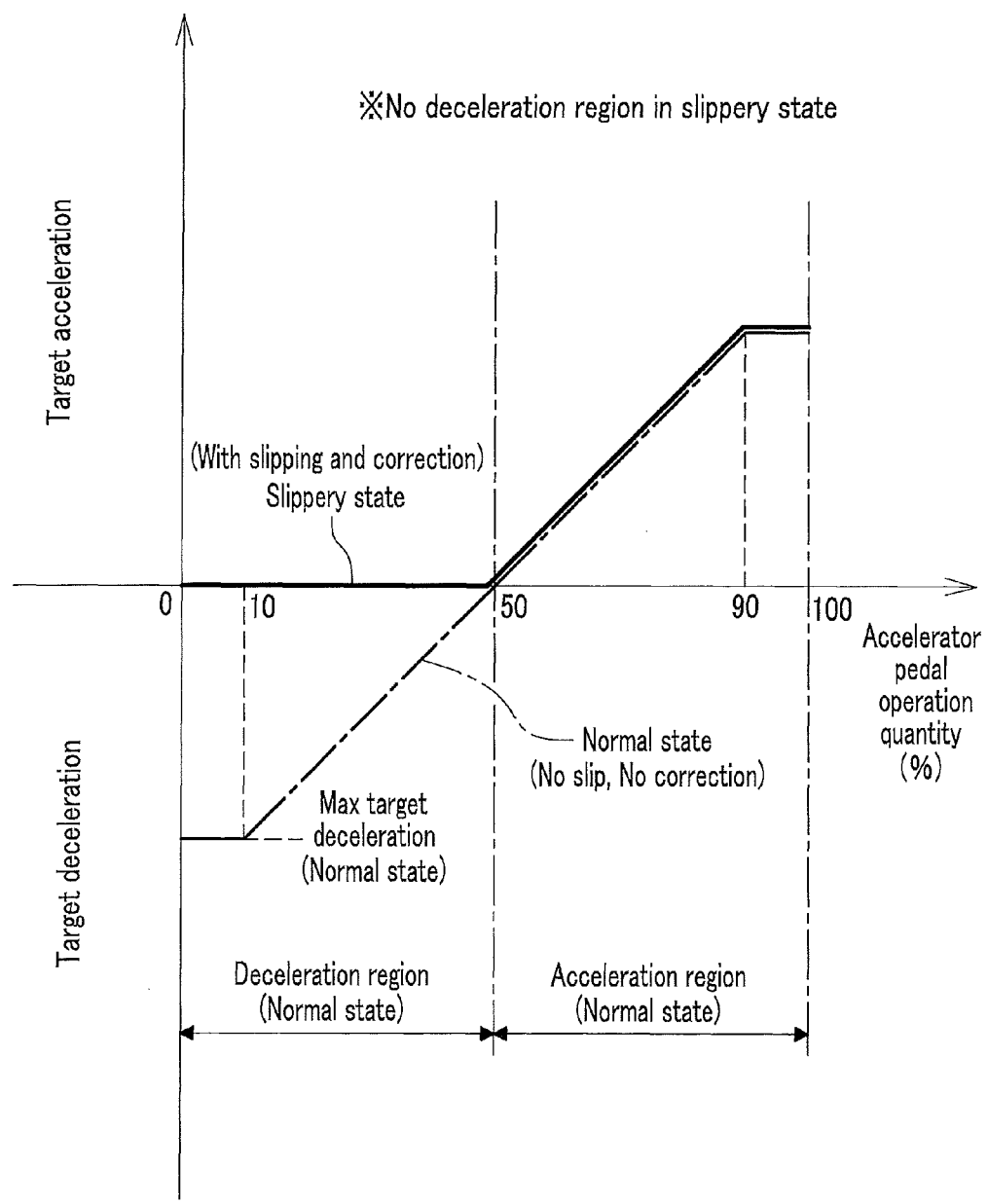
FIG. 10 is a chart illustrating a relationship between an operation quantity of the acceleration pedal and the target acceleration or a target deceleration in the normal state and in the slipping state according to the modification.

In the above-described embodiment, as shown in FIG. 7, the configuration in which the target deceleration is decreased from that in the normal state as the deceleration region is left in the slipping state. However, another configuration in which in the slipping state, the deceleration region is eliminated in the slipping state, as shown in FIG. 10. "Elimination of the deceleration" means that the target deceleration and the target acceleration are set to zero in the range of the operation quantity of 0 to 50%.

Further, when the deceleration region is eliminated, it is desired that the controller 50 operates the informing device 41.

In the above-described embodiment, the configuration in which the operation quantity of the accelerator pedal is corrected in the slipping state, and the target deceleration is calculated on the basis of the operation quantity after correction and the basic map in FIG. 5, is exemplified. However, there may be further another configuration in which the operation quantity is not corrected, but a map only for slipping state is referred to calculate the target acceleration and the target deceleration.

In the above-described embodiment, the configuration in which, in the slipping state, the operation quantity after the correction is calculated referring to the actual operation quantity of the accelerator pedal 11 and the correction map in FIG. 6 was exemplified. However, there may be still further configuration in which the operation quantity after the correction is calculated by summing the correction shown in FIG. 11 is added to the actual operation quantity.

Figure 11:
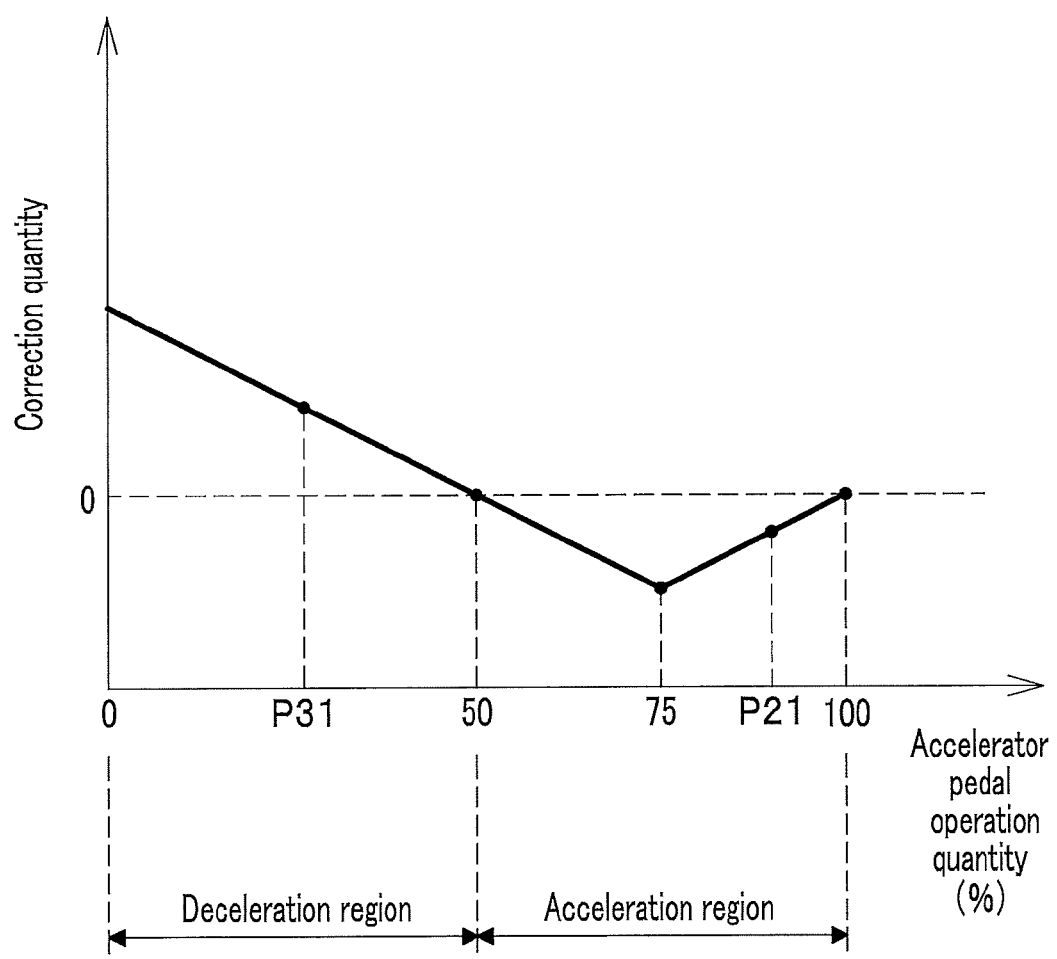
FIG. 11 shows a correction quantity to correct the operation quantity of the accelerator pedal in the slipping state according to the modification.

As shown in FIG. 11, when the actual quantity is 50%, the correction quantity is set to zero. When the actual operation quantity is 0% to 50%, the correction quantity has a positive value, and there is such a relation that the correction quantity decreases as the operation quantity increases. When the actual operation quantity is 50% to 100%, the correction quantity is set to be a negative value. Further in the range of the actual operation quantity of 50% to 75%, there is such a relation that the correction quantity becomes small as the operation quantity becomes large. In a range of the actual operation quantity of 75% to 100%, there is such a relation that the correction quantity becomes large as the operation quantity becomes large.

Figure 12:
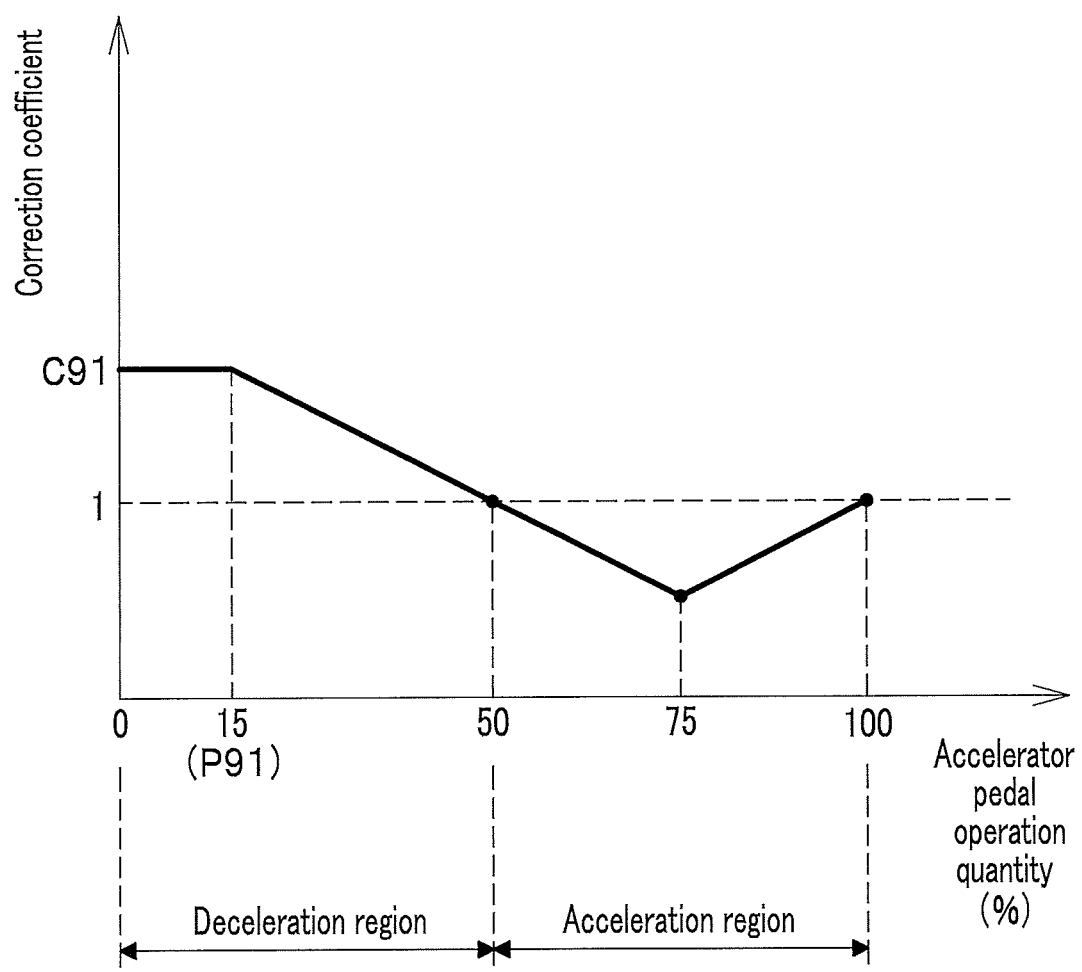
FIG. 12 shows a correction coefficient for correcting an operation quantity of the accelerator pedal in the slipping state according to the modification.

Further, there may be further configuration in which the operation quantity after correction is calculated with reference to the correction coefficient map in FIG. 12. When the actual operation quantity is equal to or greater than a predetermined operation quantity P91 (for example, 15%, predetermined value), the operation quantity after correction is calculated by multiplying the actual operation quantity with the correction coefficient shown in FIG. 12. Further, the correction coefficient is a factor for calculating the operation quantity after correction by multiplying the actual operation quantity with the correction coefficient.

As shown in FIG. 12, in the case in which the actual operation quantity is 50%, the correction coefficient is set to "1". When the actual operation quantity is 15% (P91) to 50%, a value of the correction coefficient is a value greater than "1", and there is such a relation that the correction coefficient gradually decreases as the operation quantity becomes large. When the actual operation quantity is 50 to 100%, the correction coefficient is set to a value smaller than "1". In the range of 50 to 75% in the actual operation quantity, there is such a relation that as the operation quantity becomes large, the correction coefficient becomes small. In the range of 50% to 75% in the actual operation quantity, there is such a relation that as the operation becomes large, the correction coefficient becomes large.

Figure 13:
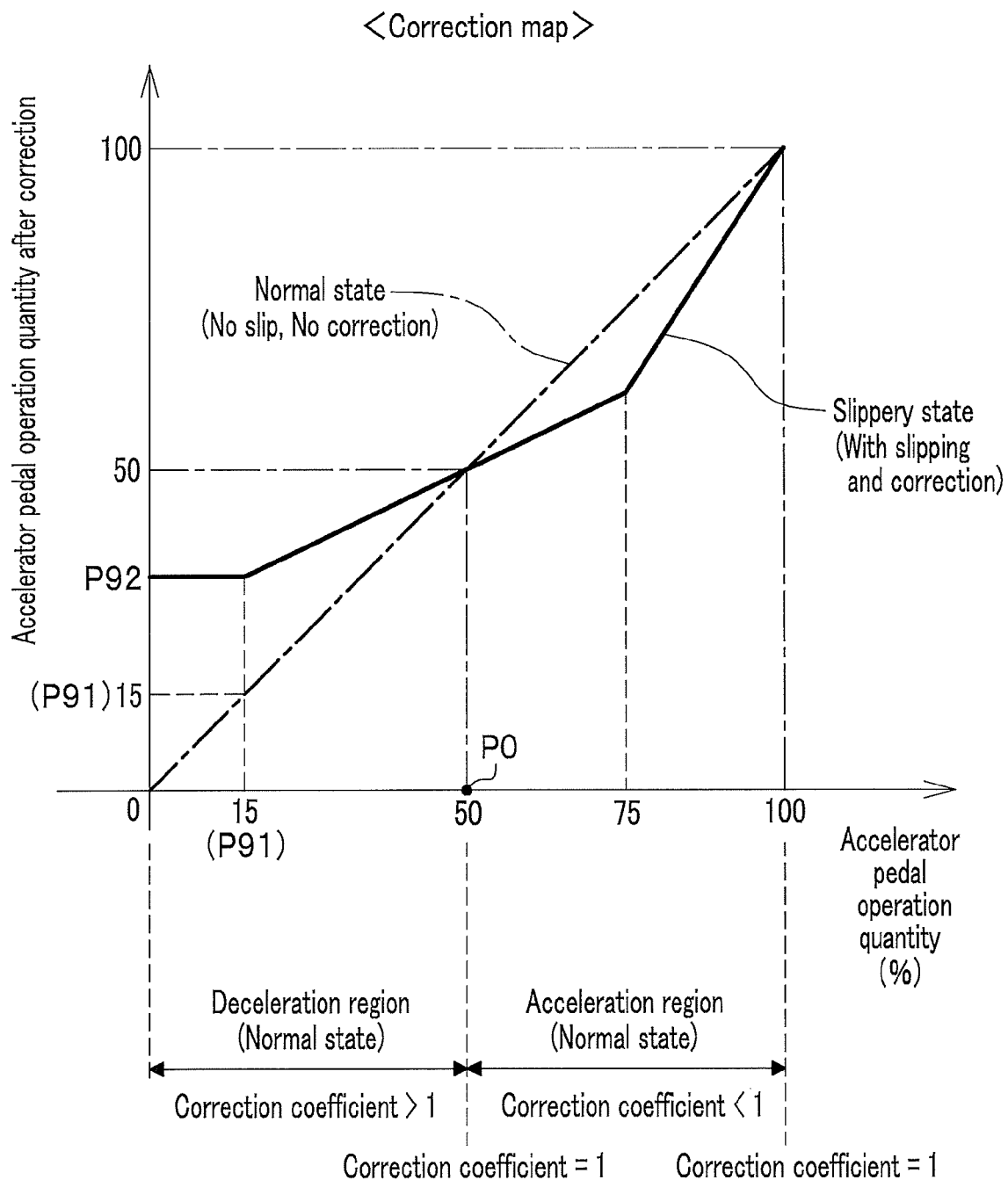
FIG. 13 is a chart illustrating a relation between the operation quantity of the accelerator pedal and a target acceleration and a target deceleration in the normal state and in the slipping state according to the modification.

On the other hand, when the actual operation quantity is 0% to 15% (P1), the correction coefficient becomes constant at a value of the correction coefficient C91 when the operation quantity is 15%. As shown in FIG. 13, when the actual operation quantity is 0% to 15%, there is such a setting that an operation quantity P92 after correction, which is constant, is corrected by multiplying the operation quantity of 15% with the correction coefficient C91, which is constant.

As described above, in the slipping state, because the operation quantity at in the deceleration region (0 to 50%) is increased by correction, the target deceleration calculated on the basis of the (actual operation quantity<the operation quantity after the correction), the operation quantity after the correction, and the basic map shown in FIG. 5 decreased from that in the normal state. That is, the maximum deceleration set in the released state of the accelerator pedal 11 in the deceleration region decreases also. Further, in the acceleration region of 50% to 100%, the operation quantity after correction becomes small, so that the target acceleration decreases from that in the normal state.

DESCRIPTION OF REFERENCE SYMBOLS

1 vehicular control system
11 accelerator pedal (operation pedal)
12 accelerator pedal operation quantity sensor
21 state detector
31 acceleration generating means
32 deceleration generating means
41 informing device
50 controller
G11 target acceleration
G21 target acceleration
G21' target acceleration
G31 target deceleration
G31' normal state target deceleration speed

The invention claimed is:
1. A vehicular control system comprising:
 a controller for controlling acceleration and deceleration of a vehicle in accordance with the operation quantity of an operation pedal;
 a state detector for detecting whether a vehicle wheel is in a slipping state or not; and
 corrected operation quantity acquiring means for acquiring the corrected operation quantity which is derived by correcting the operation quantity of the operation pedal on the basis of the detection result of the state detector,
 wherein the controller:
 sets, with respect to the operation quantity, a deceleration region and an acceleration region, the deceleration region corresponding to the operation quantity having a relatively small value, the acceleration region corresponding to the operation quantity having a relatively large value;
 sets the deceleration in the deceleration region and the acceleration in the acceleration region on the basis of the corrected operation quantity acquired by the corrected operation quantity acquiring means;
 controls, in at least a part of the deceleration region, the deceleration to increase as the operation quantity decreases;
 controls, in at least a part of the acceleration region, the acceleration to increase as the operation quantity increases; and
 decreases the maximum deceleration which is as large as a deceleration can be generated in the deceleration region when the state detector detects that the vehicle wheel is in a slipping state.

2. The vehicular control system as claimed in claim 1, wherein the maximum deceleration is set in a released state of the operation pedal.

3. The vehicular control system as claimed in claim 1, wherein when the state detector detects that the vehicle wheel is in the slipping state, the controller decreases a change in the deceleration or the acceleration with respect to the operation quantity of the operation pedal.

4. The vehicular control system as claimed in claim 1 further comprising an informing means that informs the driver, when the maximum deceleration in the deceleration region is decreased.

5. A vehicular control system comprising:
 a controller for controlling acceleration and deceleration of a vehicle in accordance with the operation quantity of an operation pedal;
 a state detector for detecting whether a vehicle wheel is in a slipping state or not; and
 corrected operation quantity acquiring means for acquiring the corrected operation quantity which is derived by correcting the operation quantity of the operation pedal on the basis of the detection result of the state detector,
 wherein the controller:
 sets, with respect to the operation quantity, a deceleration region and an acceleration region, the deceleration region corresponding to the operation quantity having a relatively small value, the acceleration region corresponding to the operation quantity having a relatively large value;
 sets the deceleration in the deceleration region and the acceleration in the acceleration region on the basis of the corrected operation quantity acquired by the corrected operation quantity acquiring means;
 controls, in at least a part of the deceleration region, the deceleration to increase as the operation quantity decreases;

controls, in at least a part of the acceleration region, the acceleration to increase as the operation quantity increases; and eliminates the deceleration region when the state detector detects that the vehicle wheel is in a slippery state.

6. The vehicular control system as claimed in claim 5 further comprising an informing means that informs the driver, when the deceleration region is eliminated when the state detector detects that the vehicle wheel is in the slippery state.

* * * * *